US012784725B2

(12) United States Patent
Lewry

(10) Patent No.: US 12,784,725 B2

(45) Date of Patent: Nov. 3, 2026

(54) ELECTRONIC CONTROL ARM FOR MUSICAL INSTRUMENTS

(71) Applicant: Benjamin Thomas Lewry, Kittery, ME (US)

(72) Inventor: Benjamin Thomas Lewry, Kittery, ME (US)

( * ) Notice: Subject to any disclaimer, the term of this patent is extended or adjusted under 35 U.S.C. 154(b) by 508 days.

(21) Appl. No.: 18/340,322

(22) Filed: Jun. 23, 2023

(65) Prior Publication Data

US 2023/0335097 A1 Oct. 19, 2023

Related U.S. Application Data

(63) Continuation of application No. 16/993,586, filed on Aug. 14, 2020, now Pat. No. 11,727,907.

(60) Provisional application No. 62/889,290, filed on Aug. 20, 2019.

(51) Int. Cl.
*G10H 3/18* (2006.01)
*G10D 3/153* (2020.01)

(52) U.S. Cl.
CPC ............ *G10H 3/186* (2013.01); *G10D 3/153* (2020.02); *G10H 2210/191* (2013.01); *G10H 2210/211* (2013.01)

(58) Field of Classification Search
CPC ............ G10H 3/186; G10H 2210/191; G10H 2210/211; G10D 3/153
USPC ............ 84/313
See application file for complete search history.

(56) References Cited

U.S. PATENT DOCUMENTS 2,741,146 A * 4/1956 Fender ............ G10D 3/153 84/740
4,782,732 A * 11/1988 Kato ............ G10D 3/153 84/313
4,967,631 A * 11/1990 Rose ............ G10D 3/153 84/313
5,025,703 A * 6/1991 Iba ............ G10H 3/18 84/681
5,046,393 A * 9/1991 Xenidis ............ G10D 3/153 84/313
6,415,584 B1 * 7/2002 Whittall ............ G10D 3/153 84/290
7,049,504 B1 * 5/2006 Galoyan ............ G10H 3/186 84/313
8,796,524 B1 * 8/2014 Deck ............ G10D 3/153 84/313
9,502,010 B1 * 11/2016 Cardozo ............ G10D 3/153
9,653,055 B1 * 5/2017 Savage ............ G10H 1/32
9,922,632 B1 * 3/2018 Craig ............ G10D 1/00
11,727,907 B2 * 8/2023 Lewry ............ G10H 1/0555 84/313

(Continued)

FOREIGN PATENT DOCUMENTS

DE 69907884 5/2004
DE 69907884 T2 * 5/2004 ............ G10D 3/14

*Primary Examiner* — Christina M Schreiber

(57) ABSTRACT

An electronic vibrato system for a stringed instrument comprises an actuator and microcontroller which are disposed within a chassis. The control arm moves the actuator from a resting position to non-resting, rotated positions. The system is below a face of a stringed instrument such that the system has a disposed fulcrum within the instrument. The rotated positions impart resistive forces on said actuator and imparting control signals. The microcontroller processes said control signal and modulates pitch.

24 Claims, 8 Drawing Sheets

(56) References Cited

U.S. PATENT DOCUMENTS

| | | | | |
|---|---|---|---|---|
| 2012/0318117 | A1* | 12/2012 | Deck | G10D 3/153<br>84/313 |
| 2014/0174276 | A1* | 6/2014 | Deck | G10D 3/153<br>84/313 |
| 2015/0075351 | A1* | 3/2015 | Deck | G10D 3/153<br>84/313 |
| 2018/0247618 | A1* | 8/2018 | Walker | G10H 3/188 |
| 2021/0056943 | A1* | 2/2021 | Lewry | G10H 1/0558 |
| 2021/0158786 | A1* | 5/2021 | Shibuya | G10D 3/153 |
| 2022/0093066 | A1* | 3/2022 | Savage | G10H 3/143 |
| 2022/0139360 | A1* | 5/2022 | McCormick | G10D 3/153<br>84/726 |
| 2022/0293071 | A1* | 9/2022 | Walker | G10D 3/153 |
| 2023/0245634 | A1* | 8/2023 | Powers | G10D 3/153<br>84/313 |
| 2023/0335097 | A1* | 10/2023 | Lewry | G10D 3/153 |

* cited by examiner

ELECTRONIC CONTROL ARM FOR MUSICAL INSTRUMENTS

PRIORITY CLAIM

This application is a Continuation of U.S. patent application Ser. No. 16/993,586, (U.S. Publication No. 2021/0056943 A1), filed on Aug. 14, 2020, which is based upon and claims the benefit of priority from provisional patent application 62/889,290, filed on Aug. 20, 2019, the entire content of both of which are incorporated herein by reference.

FIELD OF THE INVENTION

The present invention relates to vibratos for musical instruments. Specifically, the invention relates to the field of electronic vibrato arm systems that are intended to simulate the feel and function of mechanical systems.

BACKGROUND OF THE INVENTION

The vibrato arm is an important feature for many stringed musical instrument players because it enables musical expression by varying pitch. Traditionally this arm has allowed the user to raise and lower the pitch of their instrument by physically moving a lever that is attached by a mechanical linkage to one end of the strings. The function of a mechanical vibrato system is to change the pitch of the instrument by varying the string tension corresponding to the movement of a control arm. The string's frequency can then be raised or lowered by adding or decreasing tension through a mechanical linkage.

One of the most popular designs for a mechanical vibrato system is that of the Fender Stratocaster (U.S. Pat. No. 2,741,146A). Another is that of the Floyd Rose vibrato system (U.S. Pat. No. 4,967,631A). Both mechanical systems are based on a design in which the vibrato arm moves the bridge of the instrument in a radial motion around a fulcrum point. Emulating this radial motion is essential to reproducing the feel and aesthetic of these popular vibrato systems. It is also important to reproduce the tension or physical force required to operate these systems. The mechanical systems relied on a balance between the tension of the instrument's strings and the countering force of the springs. The forces involved in this balance will often exceed 100 lbs. of tension. Because of these strong opposing forces, the vibrato system is securely positioned at its balance point and it will quickly snap back to this point of equilibrium when not being used. The present design ensures that both the radial motion, and the forces required for operation, are reproduced in an electronic vibrato system.

The Stratocaster and Floyd Rose mechanical vibrato systems are quite robust. They are typically designed to withstand the heavy pressures of the balancing forces. They are integral to the instrument itself because they physically rotate the bridge which is an essential part of a stringed instrument. This means that the musician can use these systems aggressively and without fear of structural failure or damaging the instrument.

There are many different designs for mechanical vibrato arm systems, however these systems pose several difficult problems to the musician. Mechanical systems often go out of tune and do not return the instrument to the proper pitch after use. They also cause strings to break prematurely through "work hardening" by repeatedly bending the metal until eventual failure. Mechanical systems often require lengthy setup, installation, and calibrating procedures. Often the more advanced systems are difficult to manufacture due to a large component count and precision tolerance requirements. Many of the systems are quite large and can add weight and design restrictions to the instrument.

Because of these problems, attempts have been made to produce the pitch effects of a mechanical vibrato system by replacing them with electronic circuits and computers with digital signal processing (DSP). There has emerged a second field of electronically simulated vibrato arm designs which aim to solve the limitations of mechanical vibrato arms. The function of an electronic vibrato system is to change the pitch of the instrument by electronically measuring the position of a control arm and using this data to vary the electronic signal of the instrument. By measuring the rotational position of an actuator arm and sending a control signal to a computer processor, the pitch can be varied using analog and digital electronics. This avoids the problems associated with mechanical linkages.

Prior art in the field of electronic vibrato systems shows an assembly that is attached to the surface of the instrument. (See Tremolex U.S. Pat. No. 7,049,504B1). It was intended to be removable and to mount on existing instruments without modification. This design houses all components above the instrument's face. Because of this, the point of radial motion (or fulcrum point) is also above the surface of the instrument. This means that the actuator bar functions at a different angle relative to the players hand position than that of mechanical systems like the Stratocaster and Floyd Rose. A surface mounted system also obscures the aesthetics of the instrument by blocking the view of the instrument's facing areas.

The prior art electronic vibrato systems do not properly emulate the feel, tension, and robustness or, otherwise, the physical motion of these popular mechanical systems. These elements are extremely important to a trained musician who may have spent years developing playing techniques on a specific mechanical system.

A need exists for a vibrato system which provides the advantages of an electronic vibrato system, without sacrificing the familiar feel, robustness, and aesthetic of a mechanical system. A need for a vibrato system further exists that does not obscure the aesthetics of the instrument, especially the view of the instrument's facing areas. Furthermore, a need exists for an electronic vibrato system that is easy to manufacture because it uses only a few components. A need also exists for an electronic vibrato system having a final assembly that is robust and durable, does not require end user adjustments and is simple to operate.

SUMMARY OF THE INVENTION

An electronic vibrato system is integral to a stringed instrument's body being placed below the face of the instrument and inside the body, securely mounted therein. The electronic control arm or vibrato system combines a position sensor, an actuator, and a chassis to emulate a mechanical vibrato. This integral, electronic vibrato system is securely mounted within the musical instrument to allow for a very robust feel and permit aggressive play without fear of damage to the device or the instrument.

The system includes an actuator, disposed within and below a face of a stringed instrument. The actuator has a resting position and non-resting, rotated positions, said non-resting, rotated positions imparting resistive force on said actuator and imparting control signals, and a control arm. The control arm is disposed on the actuator and connects to the actuator at a face of the instrument. The arm moves the actuator from said resting position to said non-resting, rotated positions. The system has a microcontroller disposed within the stringed instrument and connected to said actuator, wherein said microcontroller processes said control signal and modulates pitch.

The system will further comprise a chassis disposed within the instrument below a face of the instrument. The chassis receives the actuator and permits rotational movement of said actuator into said non-resting, rotated positions. The actuator thus has a fulcrum below the face of the instrument as the actuator rotates within the instrument.

A sensor is coupled to the actuator and provides output signals based on rotation of said actuator. The output signals are processed by the microcontroller and modulates audio of said instrument. Audio may be modulated internally or using an external device. The actuator, in the resting position, has a predetermined tension mechanism force when aligned with a post in the actuator. In the non-resting, rotated position the actuator is misaligned with a post and has an increased force over said predetermined tension mechanism force.

DESCRIPTION OF THE INVENTION

Figure 1:
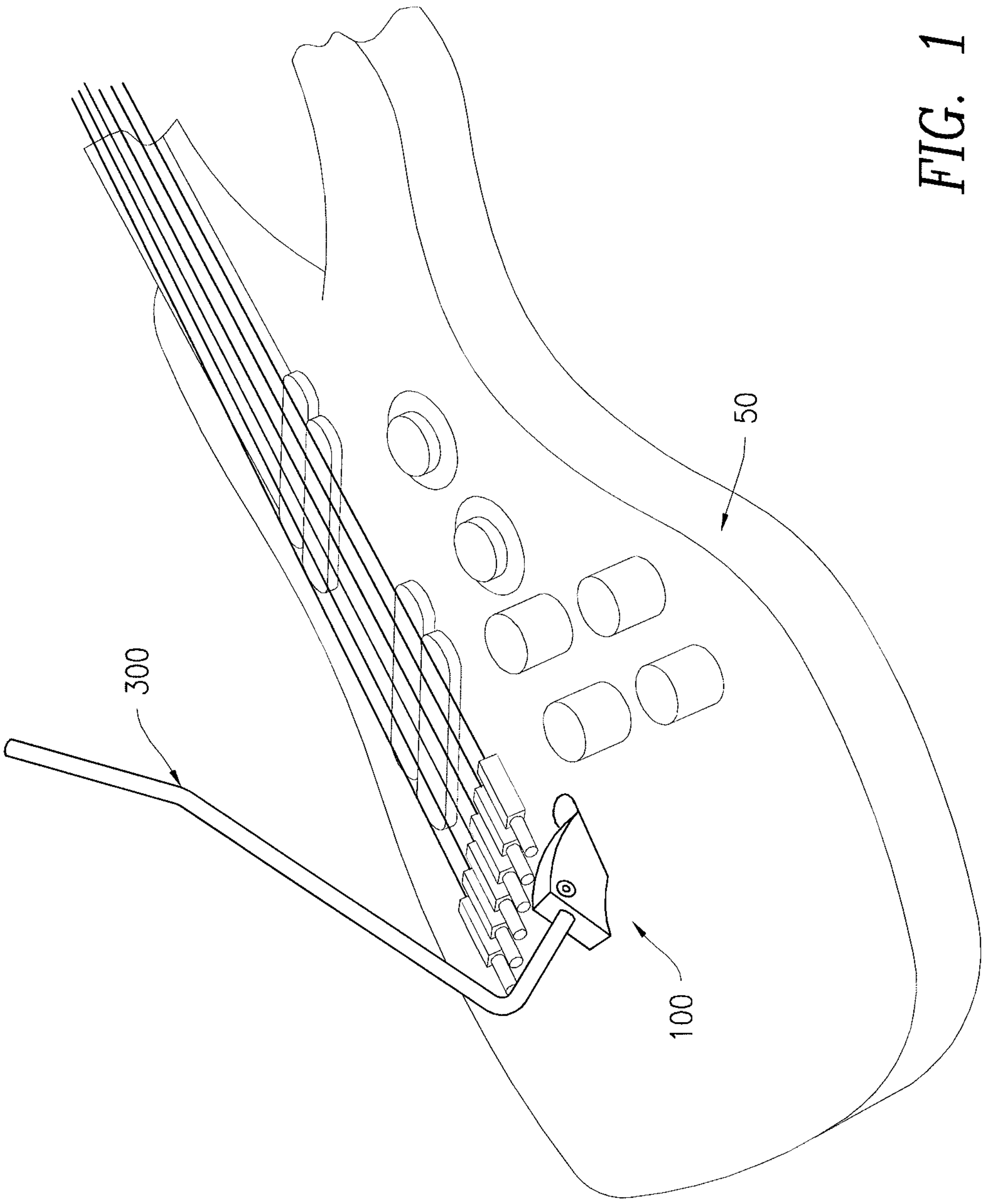
FIG. 1 shows the electronic vibrato system of the present invention disposed in a stringed instrument body.
Figure 2B:
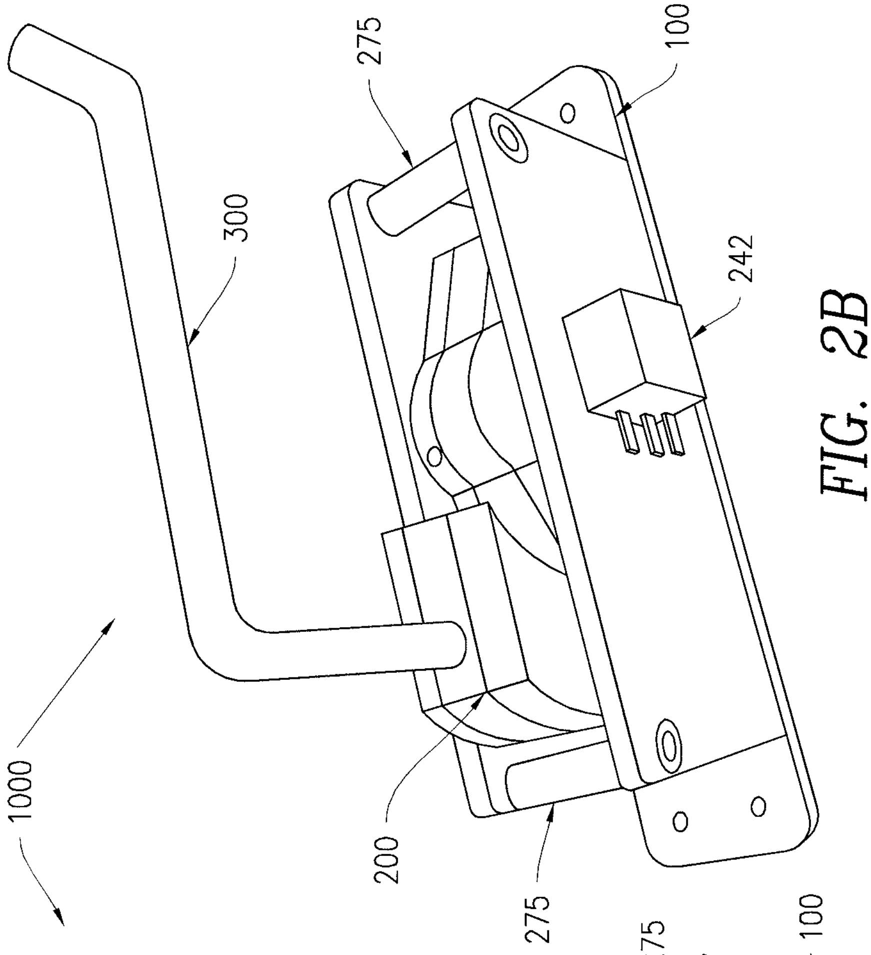
FIG. 2B shows an alternate view of the electronic vibrato system of FIG. 1.

FIGS. 1 to 2B show an electronic control arm or electronic vibrato system 1000 of the present invention disposed within a hole and below the surface of a stringed instrument body 50. The system 1000, which is mounted into the stringed instrument body 50 includes a chassis 100, an actuator assembly 200 and a control arm 300. The top of the actuator 200 is positioned through the hole in the body of the instrument 50. See FIG. 1.

By disposing the system hardware below the face or surface of the instrument the chassis and operating components are kept from interfering with a musician's movements while playing. The internal and integral system also preserves the aesthetic qualities of the face of the instrument. Furthermore, the internal, integral system places the point of radial rotation very close to that of a fulcrum style mechanical vibrato system, emulating both the look and familiar feel of these popular designs.

Figure 2A:
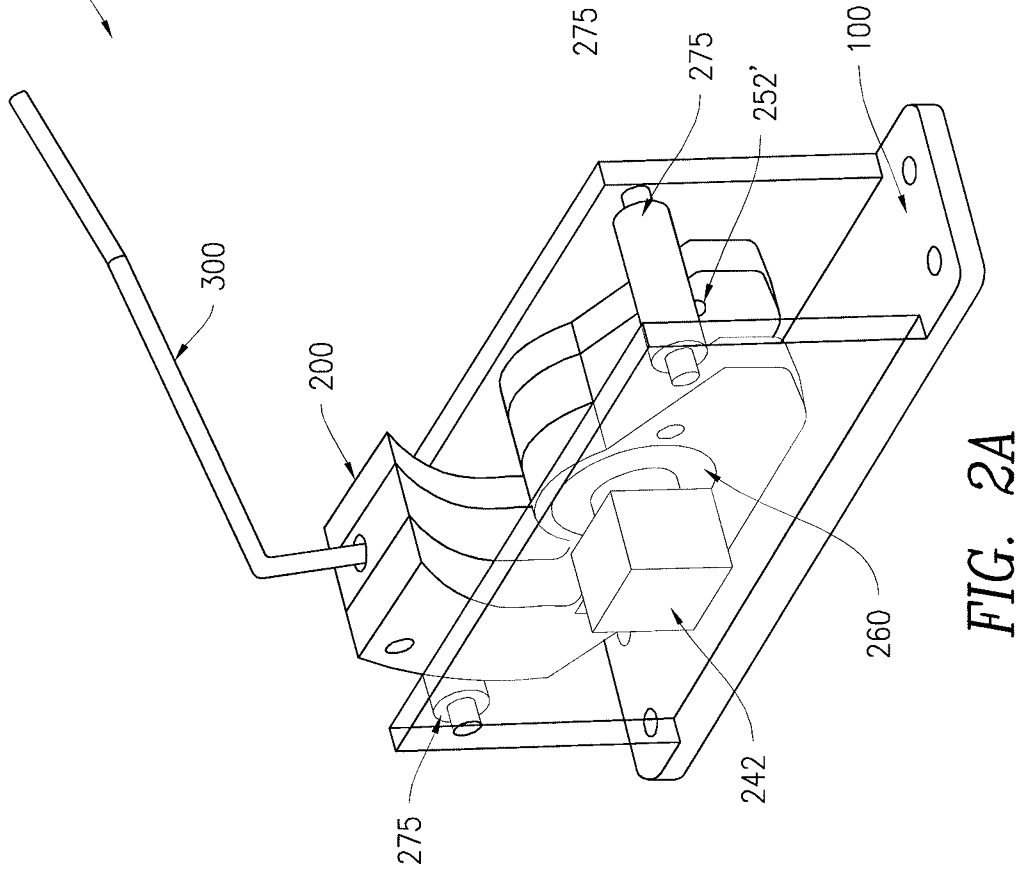
FIG. 2A shows a view of the electronic vibrato system of FIG. 1.

FIGS. 2A and 2B show the system 1000 from different ends and in a neutral or resting state. The actuator 200 is shown inside the chassis 100. It should be noted that the orientation of the entire assembly in the body can be mounted as pictured in FIG. 1-2B, or the reverse of what is pictured, depending on design limitations of the instrument or personal preference.

Figure 3:
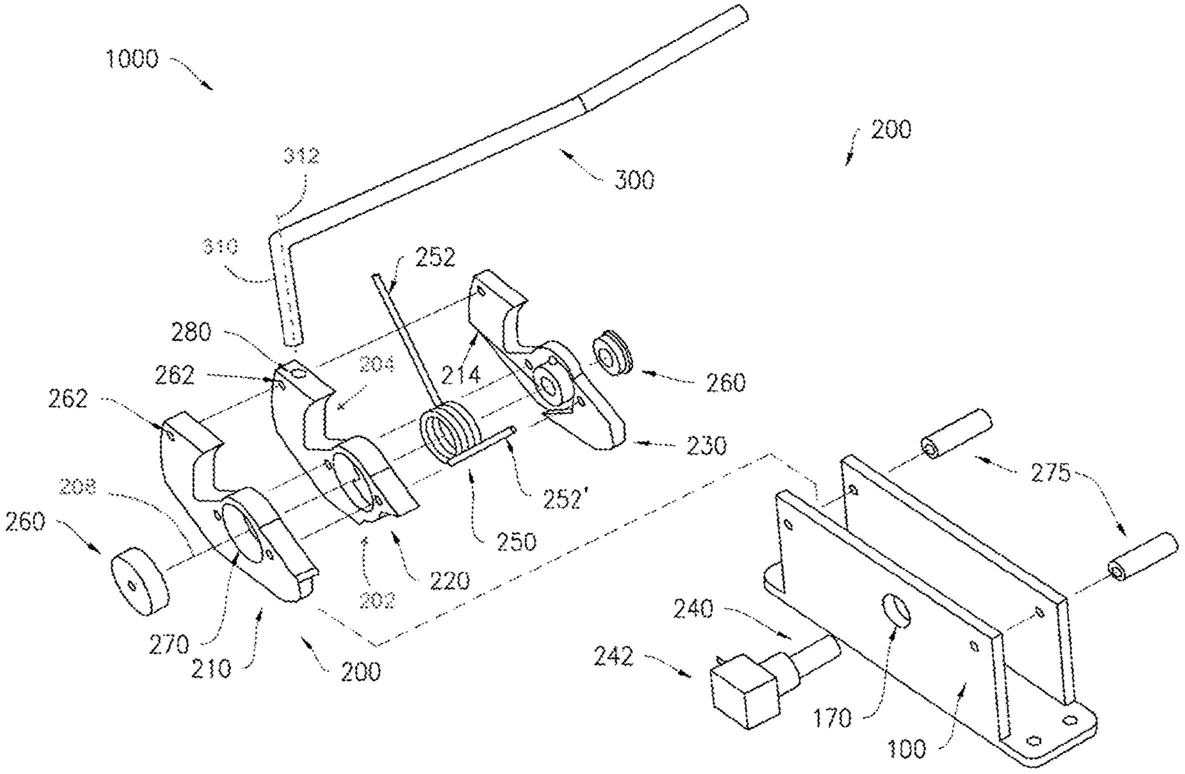
FIG. 3 shows an exploded view of the electronic vibrato system of the present invention.

The chassis 100 and actuator assembly 200 of the system 1000 are shown in further detail in exploded FIG. 3. The chassis 100 is a frame-type structure that receives and permits mounting of the actuator 200 on a shaft 240. In one embodiment, the chassis 100 may be made in a U-shape. As shown in the figures, the chassis 100 is a U-shaped extrusion through which a hole 170 is drilled. Hole 170 marks a central pivot point for all components in system 1000.

The actuator may comprise three plates 210, 220 and 230 and includes tension mechanism 250. The tension mechanism 250 may be anything that imparts pressure or tension. In one embodiment tension mechanism 250 may be a spring. In other embodiments, tension mechanism may be but is not limited to a rubber band, magnets or the like and be heavy or light to impart different feeling or tension by the system 100.

Hole 280 shown on plate 220 of actuator 200 is used to mount the control arm 300. It will be understood that there may be one or more plates. The actuator 200 may comprise a hub 202 and an extension 204. The hub 202 may comprise hub portions of one or more plates of the actuator 200 and the extension 204 may comprise extension portions of one or more plates of the actuator 200. A hub axis 208 may be the axis about which the actuator 200 is rotatable when in operation. The control arm 300 may include a control arm stem 310 defining a longitudinal axis 312. The hole 280 may be a receptacle used to mount the control arm 300 such that the longitudinal axis 312 of the control arm stem 310 and the hub axis 208 are skew with respect to each other. In various examples, extension 204 is an arcuate extension. As shown in the figures, the control arm 300 connects and is attached to the actuator 200 at the face of the instrument 50 and rotates on ball bearings 260 around shaft 240. The shaft 240 and the actuator 200 are coupled together, so that when the actuator 200 rotates the shaft 240 will rotate as well. The actuator 200 being below the face or surface of the instrument 50, creates a fulcrum below the top surface of the stringed instrument 50. Thus, the vibrato control arm 300 moves in a rotational motion toward and away from the front of the instrument 50 about the fulcrum point at which the actuator 200 of system 1000 pivots. The actuator is therefore able to descend into the instrument body 50 and pivot in a very similar rotational motion to mechanical vibrato systems. Once assembled, a musician is able to control the angle of rotation of the system 1000. In implementations having multiple plates, there may be a coupling feature 262 in one or more of the plates, which may enable the assembly of the plates. For example, as illustrated in FIG. 3, the coupling feature 262 may include one or more holes in each plate through which a pin may pass (e.g., in an interference or transition fit).

FIG. 3 also shows the geometry of the actuator 200. The tension mechanism 250 has two arms 252, 252' which are positioned inside the actuator 200 assembly by shelf 214 that is cut into the plate 230 and shelf that is cut into plate 210 (not shown). The center hole 270 of the actuator 200 positions the tension mechanism 250 in the actuator 200 assembly. The actuator 200 rests in the neutral position between the tension of the two arms 252, 252'. The combined tension of the arms work together to position the actuator in this center, neutral position. When the actuator 200 is in non-resting positions, it is rotated in either direction. As a result the tension of the tension mechanism 250 increases as the arms 252, 252' move away from each other. Here, when the arms are rotating away from each other the tension in the tension mechanism 250 increases and creates a positive tension.

When the system 1000 is in the resting position, arms 252, 252' align with posts 275, see FIG. 1-2B. The posts 275 hold the assembled actuator 200 in the central resting position. If the posts 275 are too low, the actuator 200 will not return to the same position due to friction forces. If the posts 275 are too high, the actuator 200 will rock or wobble in its resting position.

Figure 5:
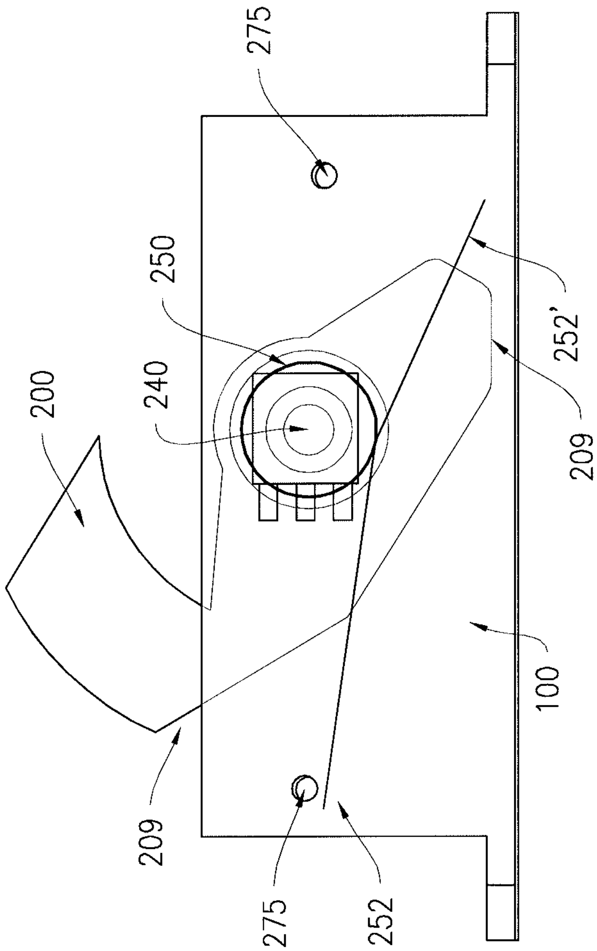
FIG. 5 shows the rotational motion of the actuator of the electronic vibrato system in an alternate position without the control arm.
Figure 4:
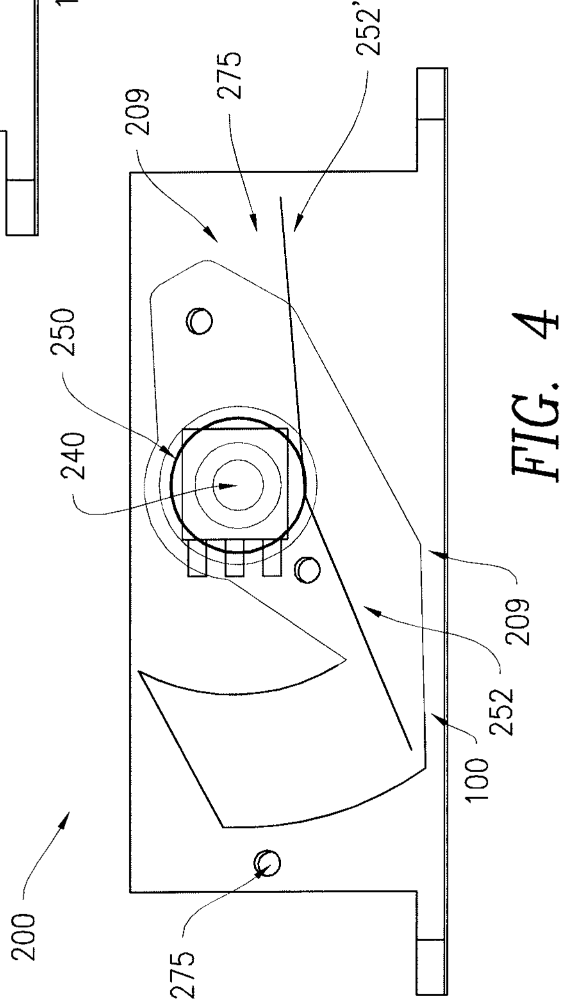
FIG. 4 shows the rotational motion of the actuator of the electronic vibrato system in a first position without the control arm.

Once the actuator 200 is moved from the resting position, see FIGS. 4 and 5, the angle of the actuator 200 is determined by the angle of the tension mechanism arms 252, 252' to the posts 275. The angle of the actuator 200 employs geometry that will hold the tension mechanism 250 at a certain tension in the resting position. This resting tension imparts a predetermined force which increases immediately when the actuator 200 is rotated. This is similar to a mechanical vibrato system that increases resistive force quickly as it moves away from the equilibrium point. The rotational forces required to operate system 1000 can be increased or decreased by changing the geometric angles of the actuator 200, or by using a different tension mechanism component.

The tension mechanism 250 is a component which provides resistive forces. The tension mechanism 250 is contained inside the actuator 200 that secures it in operating position. In one embodiment, the tension mechanism 250 is positioned concentrically over the shaft 240 with arms 252, 252' extending to either side of the actuator shelves (e.g., the actuator shelf 214). This allows the actuator 200 to absorb the forces of the tension mechanism 250 when it is in resting position, and to increase those forces as the actuator 200 is moved in a clockwise or counterclockwise direction. The tension mechanism arms 252, 252' extend beyond the actuator 200 and are positioned under posts 275 which are mounted in the chassis 100. These posts 275 provide the counter force which opens the tension mechanism 250 when the actuator 200 is rotated.

FIGS. 4 and 5 show the actuator 200 in non-resting positions after it has been rotated fully in each direction, away from the center resting point. The tension mechanism arms 252, 252' are shown in a flexed position below the posts 275. In this position they are adding a resistive force to the actuator rotation. When the control arm 300 is moved up or down, the actuator 200 pivots and rotates in the instrument 50 and the circumferential distance between the arms 252, 252' is increased by the post 275 and the shelves (e.g., the actuator shelf 214). This opening of the arms 252, 252' of the tension mechanism increases the force applied to the actuator 200. Conversely, when the control arm 300 is released a closing force is provided to the actuator 200.

Flat surfaces 209 of actuator 200 align with the chassis 100 housing at each position, to limit the rotation. Load forces of these motion stops are transferred directly to the chassis 100. This keeps those forces from damaging the tension mechanism 250 or sensor systems 242 and provides for a very strong and sturdy feeling device for the user of system 1000. FIGS. 4 and 5 show angles of rotation of the actuator 200 within the chassis 100. In this way, the motion stops configure the actuator 200 and the chassis 100 to limit motion of the actuator (e.g., rotation in a first direction or a second direction is limited).

Shaft 240 is inserted through central hole 270 of actuator 200, which aligns with hole 170 of the chassis 100. As a result, the actuator 200 is allowed to rotate about the shaft 240 inside the chassis 100. The shaft 240 can be supported on ball bearings 260 to reduce friction and allow for rapid rotation within the chassis 100. The shaft 240 is coupled to the actuator 200. Specifically, the hole 270 in plate 210 of actuator 200 couples to the shaft 240. The shaft 240 is coupled to or attached to an electronic position sensor 242 which measures the angle of rotation electronically. As the sensor 242 is rotated in one direction the voltage will increase. As the sensor 242 is rotated in the other direction the voltage will decrease. The system 1000 is configured to allows all load forces on the system 1000 to be transferred to the chassis 100 through the ball bearings 260 and not placed on the position sensor 242. As a result, inexpensive sensor components may be used and have a predicted long operational life.

The electronic position sensor 242 is used to measure the position of the control arm 300. This electronic position sensor 242 can be one of several different types. In one embodiment, the potentiometer is used in another a hall effect sensor is used, however others may equally be used. The sensors 242 used with the present invention will be coupled with a structure that can contain the force load.

The sensor 242 is electrically connected to a microcontroller or computer, which is built into the stringed instrument and wired to sensor 242. The sensor 242 will read the rotational position of the shaft 240 and output a voltage or electrical signal to a processor, a microcontroller, which both processes the control signal and modulates pitch. This signal can be used to modulate the audio from the stringed instrument 50 in a variety of ways. In one embodiment, output is to a computer or digital signal processor (DSP) that can read the position of the sensor 242 and modulate the audio before it leaves the instrument body. In another embodiment, output is a MIDI (Musical Instrument Digital Interface) or similar signal to an external device which can modulate the audio.

Figure 6:
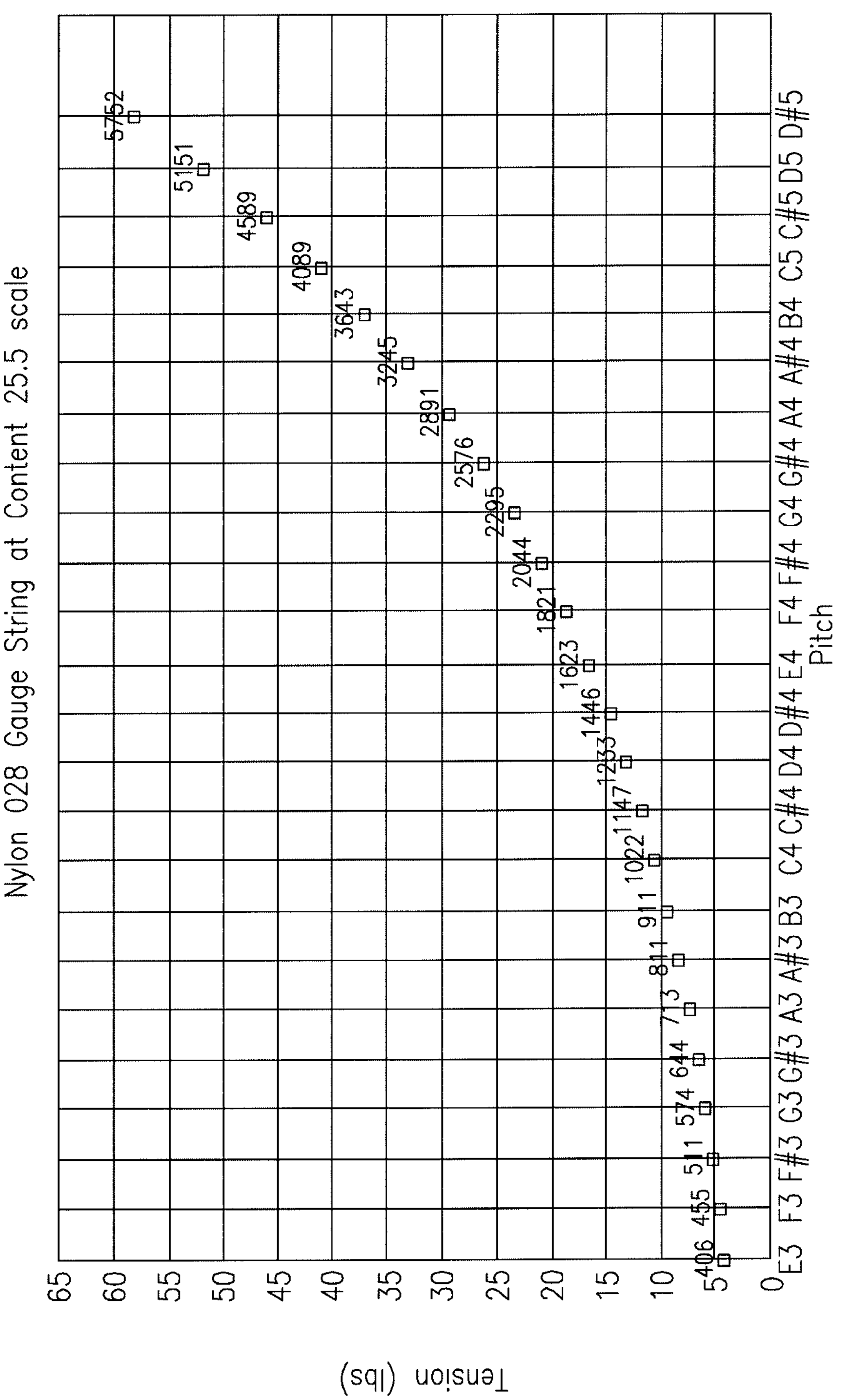
FIG. 6 shows the non-linear relation between string tension and frequency for prior art mechanical vibrato systems.

Mechanical vibrato systems will typically have a non-linear rate of pitch change relative to a radial position change. FIG. 6 is a chart showing one example of the non-linear relation of string tension to pitch for a typical stringed instrument with a mechanical vibrato system. To make the electronic vibrato system 1000 sensitive and musically expressive, the digital position data from the sensor 242 can be processed into a non-linear output data. In this manner, the change in rotational position of the control arm would correspond to an increasing (or decreasing) rate of change to the output signal. This would make small movements near the resting position of the bar less sensitive and easier to control, and greater movements more dynamic. It would also allow for the system to more closely simulate the non-linear performance of a mechanical system.

In use, after a note is played on the stringed instrument, a user is able to modulate the note by adjusting the position of the control arm 300, up or down, from the central resting position. The control arm 300 is attached to the actuator 200 which rotates on ball bearings 260 around shaft 240. The shaft 240 and the actuator 200 are coupled together, so that when the actuator 200 rotates the shaft 240 will rotate as well.

The electronic position sensor 242 is attached to the shaft 240. The sensor 242 can vary a voltage depending on rotational position. For example, if a total of three volts are used, the sensor 242 can vary the voltage from zero to three. When the sensor 242 is in the central resting position, it will output a voltage somewhere between zero and three volts. As the sensor 242 is rotated in a first direction the voltage will increase. As the sensor 242 is rotated in the opposite direction the voltage will decrease.

The microcontroller uses an analog to digital converter (ADC) to change the analog voltage values into digital values. For example, a range of zero to three volts can be divided into 1024 digital increments (0 to 1023) by the ADC. If the sensor outputs 1 volt, then the ADC would return a digital value of approximately 341. If the sensor 242 increased the voltage to 1.2 volts, the ADC would return a digital value of about 409. As the sensor 242 reaches 3 volts, the ADC will generate a maximum digital value of 1023.

The digital values of the ADC often fluctuate rapidly as they are being generated. Several small fluctuations can be filtered or smoothed by being averaged over time to create smoother transitions between rising or falling integers. The microcontroller will then use the filtered data to generate a control signal, which is used to communicate with the Digital Signal Processor (DSP). When the control signal is MIDI, such signals are typically made up of 128 integers. The microcontroller will map digital values from the ADC to corresponding MIDI integers.

In one embodiment, digital values are mapped as linear output. Under this scenario, values 0 through 1023 will correspond directly to MIDI integers 0 to 127. A simple ratio formula is used. Here, 1 volt is read by the ADC at 341 and the microcontroller will generate a MIDI integer of approximately 43. (341×128/1024=42.625). Other linear mappings can be used that limit or expand the range of the ADC values.

In another embodiment, digital values are mapped as non-linear output. Non-linear mapping can be used to make parts of the rotational angle of the sensor feel more sensitive or less sensitive to the musician. Prior art, mechanical vibrato systems typically have a non-linear relationship between rotational angle and the amount of frequency change. See FIG. 6. For example, a 5-degree angle of rotation may produce 10 hertz drop in pitch. However, a 10-degree angle of rotation might result in a 40 hertz drop in pitch. The physics equation of string mass and tension to frequency is non-linear and can be mathematically predicted by Mersenne's laws, Mersenne's equation 22. In one embodiment of the present invention, the microcontroller is programmed to use non-linear equations when mapping the digital values of the ACD to the control signal integers. As a result, the present invention is able to simulate the rate of frequency modulation of a prior art mechanical system.

The mapped control signal is then sent from the microcontroller to the Digital Signal Processor (DSP). The DSP will modulate the frequency of incoming electronic audio waveforms and output similar waveforms, but at a different frequency. Through this method, the user can modulate the frequency of the pitch of the instrument by using the control arm 300 to communicate, via the microcontroller, with the DSP.

Figure 7:
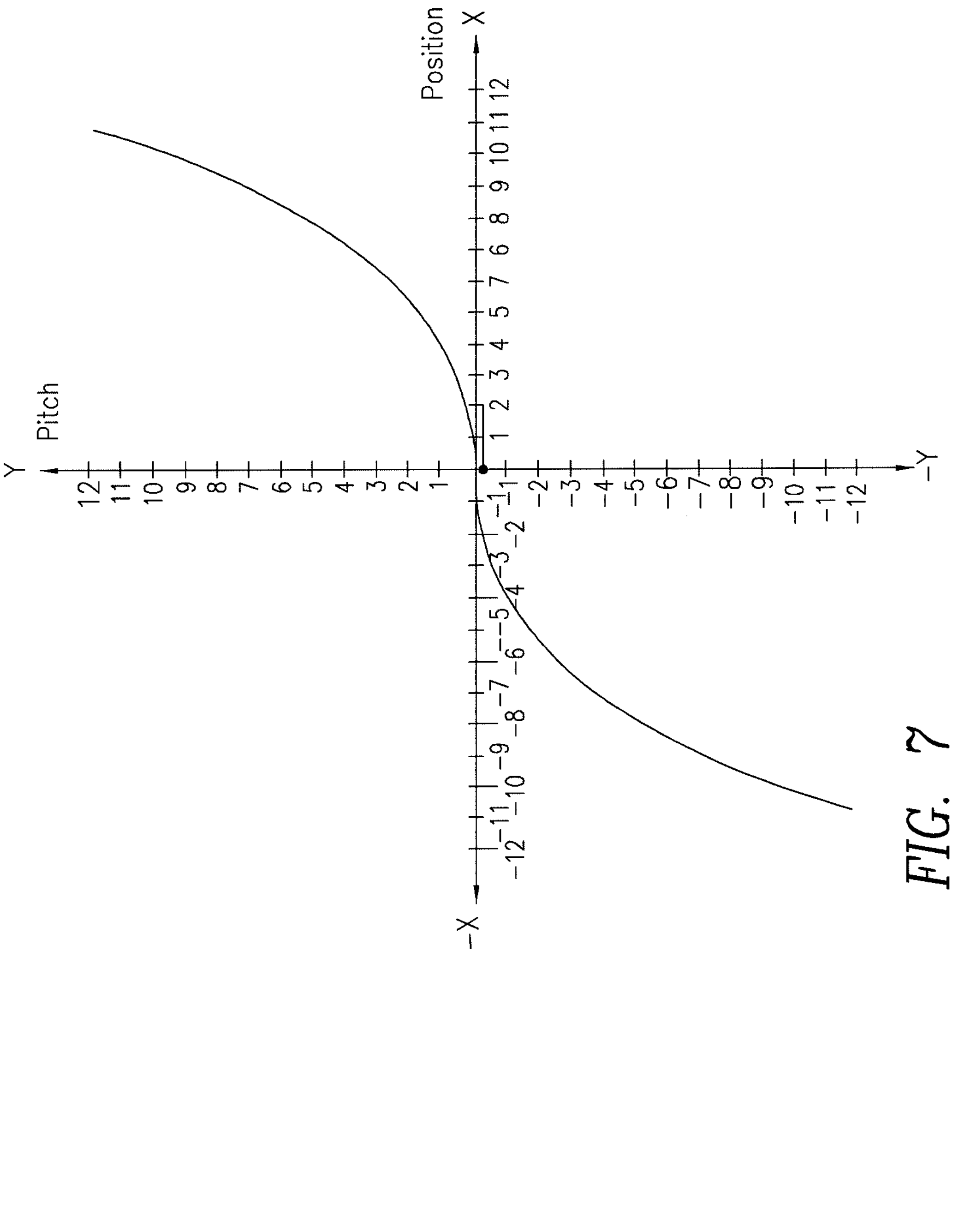
FIG. 7 is a cartesian representation of a non linear output curve for electronic vibrato systems.

FIG. 7 is a cartesian representation of an electrically generated non-linear output signal. The X axis represents a positive and negative rotational angle from the resting position 0. The Y axis represents a corresponding musical pitch. As the radial angle of the control arm moves away from 0, the rate of change in pitch increases.

During manufacture, when coupling a sensor 242 to the rotating shaft 240, it can be difficult to perfectly align the sensor position 242 to the shaft 240 angle. Also, as the sensor 242 is used over time, it's position or voltage output can drift slightly or change due to fatigue, environmental factors, variables due to manufacturing, etc. To properly align the sensor 242 every time the instrument is played, an "auto-calibration" program can be run by the microcontroller to determine the resting position of the sensor 242.

The "auto-calibration" program will read the current resting position of the sensor 242 and scale the desired output values from this position. If the resting position of the sensor 242 changes for some reason, the output values can be adjusted accordingly. When calibrating, the microcontroller takes a reading of the ADC while the control arm 300 is in its central resting position. Then it changes the control signal mappings to correspond with the positional readings.

In one embodiment, these output signals are translated to the MIDI protocol to talk with other musical equipment. In another embodiment, these output signals are sent to a Digital Signal Processor. This DSP can use the positional data to modulate the signal of the musical instrument.

Other types of data calculations can be performed on the sensor output. In one embodiment, switches or other sensors can be mounted to the control arm 300, or elsewhere, that can change how this data is used. This may allow for different ranges or sensitivity to be adjusted, or they could add features like a secondary signal for musical expression. Another embodiment includes a position sensor which can determine the rotational position of the control arm 300 inside the mounting hole 280. A further embodiment includes a touch sensor that can determine when the control arm 300 is being held by the hand of the musician. These sensors could be useful for musical expression, or for muting the signal when not in use.

Figure 8:
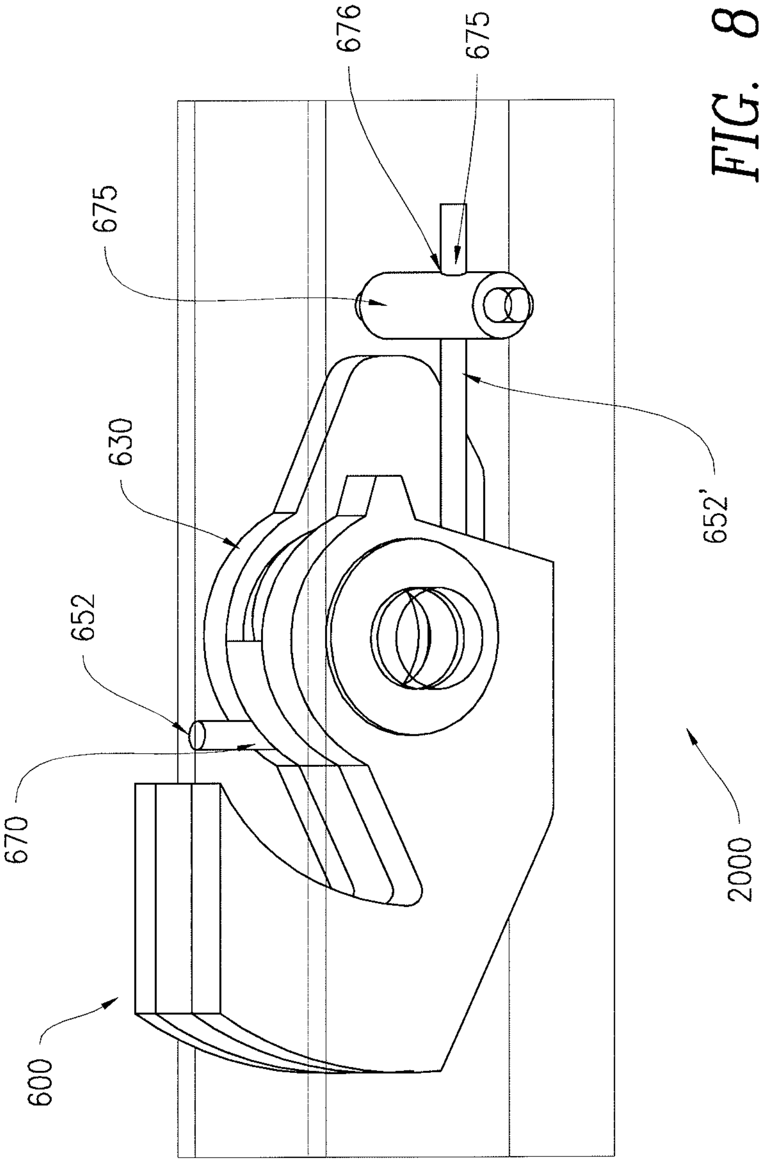
FIG. 8 shows a view of the electronic vibrato system of an alternate embodiment.
Figure 9:
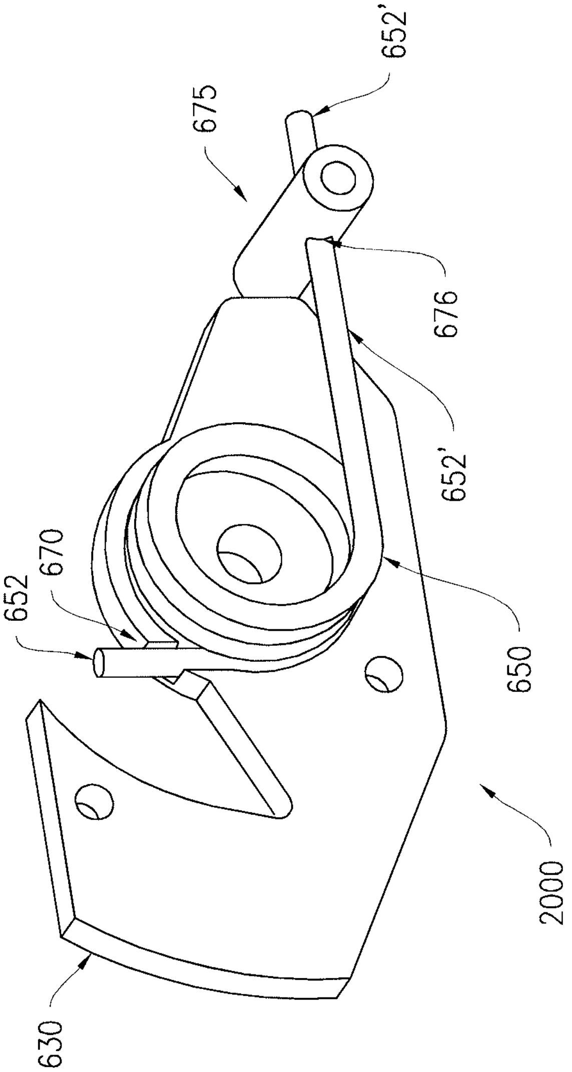
FIG. 9 shows the actuator of FIG. 8 with panels removed to show tension mechanism.

FIGS. 8 and 9 show a second embodiment of the electronic vibrato system 2000. The system 2000 includes an actuator 600 with a tension mechanism 650 disposed therein. Tension mechanism 650 has arms 652, 652'. Arm 652 is disposed within and anchored to notch 670, which is cut into plate 630 of the actuator 600. When the actuator 600 is rotated, arm 652 is coupled to the actuator 600. Arm 652' is static as it is disposed through and fixed to hole 676.

In system 2000, the tension mechanism 650 will flex in two directions with respect to its resting state. When the actuator 600 is rotated away from post 675, the tension mechanism 650 is flexed open from its resting position, increasing tension. When the actuator 600 is moved in the opposite direction, the tension mechanism 650 experiences compression, resulting in a negative force from its resting position. Thus, the system 2000 uses a single arm 652' of tension mechanism 650 to create either positive tension by expanding, or negative tension by being compressed.

As the force on the tension mechanism 650 decreases to zero at its center-resting position, no obstruction is felt when transitioning between positive and negative tension positions. System 2000 thus imparts a very smooth feel when users transition between upward and downward vibrato. In one non-limiting example, the tension mechanism 650 is a torsion spring.

When the entire system 1000, 2000 is assembled, the actuator 200, 600 assembly will fit neatly within the chassis 100 and be allowed to rotate on ball bearings 260, while coupled to the shaft 240. In one embodiment, the plates 210, 220 and 230 of actuator 200 or plates of actuator 600 may be manufactured separately and may be joined together with fasteners to form one single unit. In another embodiment, the actuator 200, 600 sub-assembly can be machined from a single sheet of material. The tension mechanism 250 is enclosed inside the assembly of the three joined plates 210, 220 and 230. The moving parts and sensor are protected from dust and debris by the system 1000, 2000 being one single unit.

The final assembly of the system 1000, 2000 has very few moving parts and uses only a single tension mechanism 250, 650, respectively, to create forces in two directions. The assembly employs geometry to emulate a mechanical vibrato system. There is no adjustment or calibration procedures and this results in a pleasing experience for the musician and very long life expectancy of the components. The system 1000, 2000 has the additional advantage of being easy to manufacture because it uses only a few components. The final assembly of the system 1000, 2000 is robust and durable and has no end user adjustments, so it is very simple to operate.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

I claim:

1. A system for modulating an audio output of a string instrument, comprising:

an actuator body including a hub and an extension, wherein the actuator body is configured to rotate in either a first rotation direction or a second rotation direction, from a resting position of the actuator body, about an axis effected by a pivotable connection when at least a portion of the actuator body is disposed at least partially within a string instrument body of a string instrument;

wherein the extension is configured such that:

when the actuator body is rotated in the first rotation direction, a portion of the extension disposed within the string instrument body increases; and when the actuator body is rotated in the second rotation direction, the portion of the extension disposed within the string instrument body decreases.

2. The system of claim 1, further comprising an electronic position sensor configured to modulate an electrical signal in response to rotation of the actuator body about the axis.

3. The system of claim 2, wherein the electronic position sensor is a potentiometer or a hall sensor.

4. The system of claim 1, wherein the extension is an arcuate extension.

5. The system of claim 1, wherein the pivotable connection pivotably connects the hub and a chassis.

6. The system of claim 5, wherein the chassis comprises a sidewall, wherein the axis is normal to the sidewall.

7. The system of claim 6, wherein the pivotable connection comprises a shaft collinear with the axis, the shaft connecting the sidewall to the hub.

8. The system of claim 7, wherein:

the shaft is fixed to the sidewall, and the hub is configured to rotate about the shaft; or the shaft is fixed to the hub, and the shaft and hub are configured to rotate relative to the sidewall.

9. The system of claim 5, wherein the chassis is configured to limit an extent of rotation of the actuator body in the first rotation direction or the second rotation direction.

10. The system of claim 1, wherein the pivotable connection comprises a shaft coupled to the hub and supported by a chassis configured to be installed in the string instrument body.

11. The system of claim 1, wherein the pivotable connection comprises a bearing.

12. The system of claim 1, wherein the extension comprises a control arm receptacle.

13. The system of claim 1, wherein the portion of the extension disposed within the string instrument body is configured to not extend through a top surface of the string instrument body when the actuator body is in the resting position.

14. The system of claim 1, further comprising a resistive mechanism configured to resist rotation of the actuator body about the axis in the first rotation direction or the second rotation direction from the resting position.

15. The system of claim 14, wherein the resistive mechanism is a torsion spring, and wherein the resting position of the actuator body is defined by an equilibrium position of the torsion spring.

16. An apparatus configured for installation at least partially within a string instrument body of a string instrument and for use in modulating an audio output of the string instrument, comprising:

a chassis; and an actuator body including a hub and an extension, the extension including a control arm receptacle, wherein the hub is pivotably coupled to the chassis such that the actuator body is configured to rotate relative to the chassis in either a first rotation direction or a second rotation direction from a resting position of the actuator body, about a hub axis;

wherein the extension is configured such that, when the apparatus is disposed at least partially within the string instrument body:

when the actuator body is rotated in the first rotation direction, a portion of the extension disposed within the string instrument body increases; and when the actuator body is rotated in the second rotation direction, the portion of the extension disposed within the string instrument body decreases.

17. The apparatus of claim 16, further comprising a shaft coupled to the hub, wherein the shaft is configured to cooperate with an electronic position sensor such that rotation of the actuator body about the hub axis is detectable by the electronic position sensor.

18. The apparatus of claim 17, wherein the electronic position sensor is a potentiometer or a hall sensor.

19. The apparatus of claim 16, wherein the extension is an arcuate extension.

20. The apparatus of claim 16, wherein the hub is pivotably coupled to the chassis by a shaft coupled to the hub and supported by the chassis.

21. The apparatus of claim 20, wherein the shaft is configured to cooperate with an electronic position sensor such that rotation of the actuator body about the hub axis is detectable by the electronic position sensor.

22. The apparatus of claim 16, wherein the hub is pivotably coupled to the chassis by a bearing.

23. The apparatus of claim 16, wherein the control arm receptacle is configured to mount a control arm including a control arm stem defining a longitudinal axis, such that the longitudinal axis of the control arm stem and the hub axis are skew with respect to each other.

24. An apparatus configured for installation at least partially within a string instrument body of a string instrument and for use in modulating an audio output of the string instrument, comprising:

a chassis;

an actuator body including a hub and an extension, the extension including a control arm receptacle, wherein the hub is pivotably coupled to the chassis such that the actuator body is configured to rotate relative to the chassis in either a first rotation direction or a second rotation direction, from a resting position of the actuator body, about a hub axis;

a shaft coupled to the hub and configured to cooperate with an electronic position sensor such that rotation of the actuator body about the hub axis is detectable by the electronic position sensor; and a resistive mechanism configured to resist rotation of the actuator body about the hub axis in the first rotation direction or the second rotation direction from the resting position;

wherein the extension is configured such that:

when the actuator body is rotated in the first rotation direction, a portion of the extension received within the chassis increases; and when the actuator body is rotated in the second rotation direction, the portion of the extension received within the chassis decreases.

* * * * *